US012131198B2

(12) United States Patent
Misra et al.

(10) Patent No.: US 12,131,198 B2
(45) Date of Patent: Oct. 29, 2024

(54) COLLECTIVE APPLICATION PORTFOLIO MIGRATION CONTROL

(71) Applicant: ACCENTURE GLOBAL SOLUTIONS LIMITED, Dublin (IE)

(72) Inventors: Janardan Misra, Bangalore (IN); Vikrant Kaulgud, Pune (IN); Kapil Singi, Bangalore (IN); Sanjay Mittal, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 431 days.

(21) Appl. No.: 17/673,615

(22) Filed: Feb. 16, 2022

(65) Prior Publication Data

US 2023/0259410 A1    Aug. 17, 2023

(51) Int. Cl.
*G06F 9/50* (2006.01)
*G06F 9/48* (2006.01)

(52) U.S. Cl.
CPC .......... *G06F 9/5088* (2013.01); *G06F 9/4881* (2013.01); *G06F 9/5072* (2013.01); *G06F 9/5077* (2013.01); *G06F 2209/505* (2013.01)

(58) Field of Classification Search
CPC ........................................................ G06F 9/50
See application file for complete search history.

(56) References Cited

U.S. PATENT DOCUMENTS

| 5,926,833 | A  | * | 7/1999 | Rasoulian | G06F 3/0626 |
|           |    |   |        |           | 714/28 |
| 8,452,797 | B1 | * | 5/2013 | Paleja    | G06Q 30/02 |
|           |    |   |        |           | 707/767 |
| 2014/0344395 | A1 | * | 11/2014 | Alexander | G06F 9/4856 |
|              |    |   |         |           | 709/217 |
| 2018/0032523 | A1 | * | 2/2018  | Singhal   | G06F 16/9024 |
| 2018/0146250 | A1 | * | 5/2018  | Cui       | H04N 21/25891 |
| 2019/0026355 | A1 | * | 1/2019  | Yano      | G06F 8/74 |

(Continued)

FOREIGN PATENT DOCUMENTS

WO    2018017057 A1    1/2018

OTHER PUBLICATIONS

Peter Taylor, Web APIs for environmental data. (Year: 2016).*

(Continued)

*Primary Examiner* — Lechi Truong
(74) *Attorney, Agent, or Firm* — Mannava & Kang, P.C.

(57) ABSTRACT

In some examples, collective application portfolio migration control may include determining, for a plurality of applications that are to be clustered for migration to a cloud environment, a coupling coefficient that represents a type of coupling between pairs of applications from the plurality of applications, a proximity coefficient that represents application proximities, and a connectedness coefficient that represents application connections. A combined application relatedness coefficient may be determined based on the coupling coefficient, the proximity coefficient, and the connectedness coefficient. A portfolio graph may be generated based on the combined application relatedness coefficient to generate migration application clusters to duster the plurality of applications. Migration of the plurality of applications to the cloud environment may be controlled based on the migration application clusters.

16 Claims, 6 Drawing Sheets

(56) References Cited

U.S. PATENT DOCUMENTS

2019/0034297 A1    1/2019  Shankarappa et al.
2020/0348929 A1*  11/2020  Sousa .................... G06F 8/36

OTHER PUBLICATIONS

Peter Taylor, web APIs for environmental data State of the art investigation. (Year: 2016).*
Peter J. Rousseeuw, "Silhouettes: A graphical Aid to the Interpretation and Validation of Cluster Analysis", University of Fribourg, ISES, Jun. 13, 1986, pp. 53-65 (13 pages).

* cited by examiner

COLLECTIVE APPLICATION PORTFOLIO MIGRATION CONTROL

BACKGROUND

Cloud migration may be described as a process of moving an organization's digital assets, services, databases, information technology (IT) resources, and applications either partially, or wholly, into the cloud. Cloud migration may also include moving from one cloud to another.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Collective application portfolio migration control apparatuses, methods for collective application portfolio migration control, and non-transitory computer readable media having stored thereon machine readable instructions to provide collective application portfolio migration control are disclosed herein. In some examples, the apparatuses, methods, and non-transitory computer readable media disclosed herein provide for automated synthesis of application clusters for collective cloud migration. In other examples, the apparatuses, methods, and non-transitory computer readable media disclosed herein provide for discovery of optimal clusters of applications that are to be migrated together. In some examples, the apparatuses, methods, and non-transitory computer readable media disclosed herein provide an application cluster generator to determine optimal clusters of semantically connected applications within an application portfolio for migration. In further examples, the apparatuses, methods, and non-transitory computer readable media disclosed herein provide for determination of semantic interdependencies and connectedness among applications within a portfolio in order to decide composition of clusters of applications for collective migration in order to reduce overall computational cost of migration and minimize adverse impact on the performance of migrated applications. Yet further, the apparatuses, methods, and non-transitory computer readable media disclosed herein renders the decision process of grouping applications rigorous, automated, explainable, and adaptable.

With respect to collective application portfolio migration control, cloud migration is a technically challenging, and cost intensive process. One of reasons it is technically challenging is that issues may arise unexpectedly after the migration process is deemed to be complete because an application may not behave as expected after migration compared to the behavior before migration. These technical challenges may render the process of migration cost intensive and critical to the operation of an organization.

In order to address at least the aforementioned technical challenges, the apparatuses, methods, and non-transitory computer readable media disclosed herein provide the application cluster generator to determine an optimal composition of applications which should be migrated. The optimal opposition may be determined simultaneously in order to eliminate post migration issues arising out of application coupling. The application cluster generator may also determine relatedness in order to minimize overall computational resources required for successfully completion of migration of a portfolio of applications.

According to examples disclosed herein, the apparatuses, methods, and non-transitory computer readable media disclosed herein provide for application coupling with respect to measurement of operational dependencies among applications so that coupled applications may be migrated together in order to avoid impact on their performance post migration.

According to examples disclosed herein, the apparatuses, methods, and non-transitory computer readable media disclosed herein provide for analysis of application proximity with respect to measurement of similarities among applications such that applications which are similar should be migrated together in-order to optimize utilization of overall computational resources during migration.

According to examples disclosed herein, the apparatuses, methods, and non-transitory computer readable media disclosed herein provide for analysis of application proximity with respect to measurement of how applications are connected to one another so that applications connected with each other if migrated together would facilitate reduction of migration cost.

According to examples disclosed herein, the apparatuses, methods, and non-transitory computer readable media disclosed herein provide for reduction of utilization of computational resources (e.g., processor time, network bandwidth, and energy) of state-of-the-art application migration process by making the migration process computationally efficient. Minimizing execution of computational operations required for correcting defects in application behaviors (post migration) arising due to invalidation of operational dependencies among applications.

According to examples disclosed herein, the apparatuses, methods, and non-transitory computer readable media disclosed herein provide for minimization of computational resource requirements for the migration process by enabling better resource sharing among related applications during migration. For example, applications with similar data volume migration requirements may share network channels with optimized bandwidths. In this regard, computational resource reduction for the migration process may be approximated by a factor, such as a Silhouette factor, of the migration application clusters $\Delta=[CL_1, \ldots, CL_x]$. In this regard, for each application $app_i$, the following factors may be determined:

a(i)=average ARC of $app_i$ with all other applications in its cluster b(i)=minimum of the average ARC of $app_i$ with applications in other clusters The Silhouette factor s(i) for $app_i$ may then be determined as follows:

$$s(i) = \begin{cases} 1 - a(i)/b(i) & \text{if } a(i) < b(i) \\ b(i)/a(i) - 1 & \text{otherwise} \end{cases}$$

The Silhouette factor for each cluster $CL_i$ may be determined as follows:

$$s(CL_i) = \frac{1}{|CL_i|} \sum_{app_{ij} \in CL_i} s(j)$$

An overall Silhouette factor of $\Delta$ may be determined as follows:

$$s(\Delta) = \frac{1}{n} \sum_{app_i} s(i)$$

While migrating applications within each cluster together, the migration controller as disclosed herein may utilize a fraction of computational resources, which were originally allocated. In this regard, $\lambda_{ij}$ may be specified as the original computational resource requirement for migration of application $app_{ij} \in CL_i$. The migration controller may utilize compRes($CL_i$)=s($CL_i$)*$\Sigma_{app_{ij} \in CL_i} \lambda_{ij}$ to determine the computational resources for cluster $CL_i$.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

Figure 1:
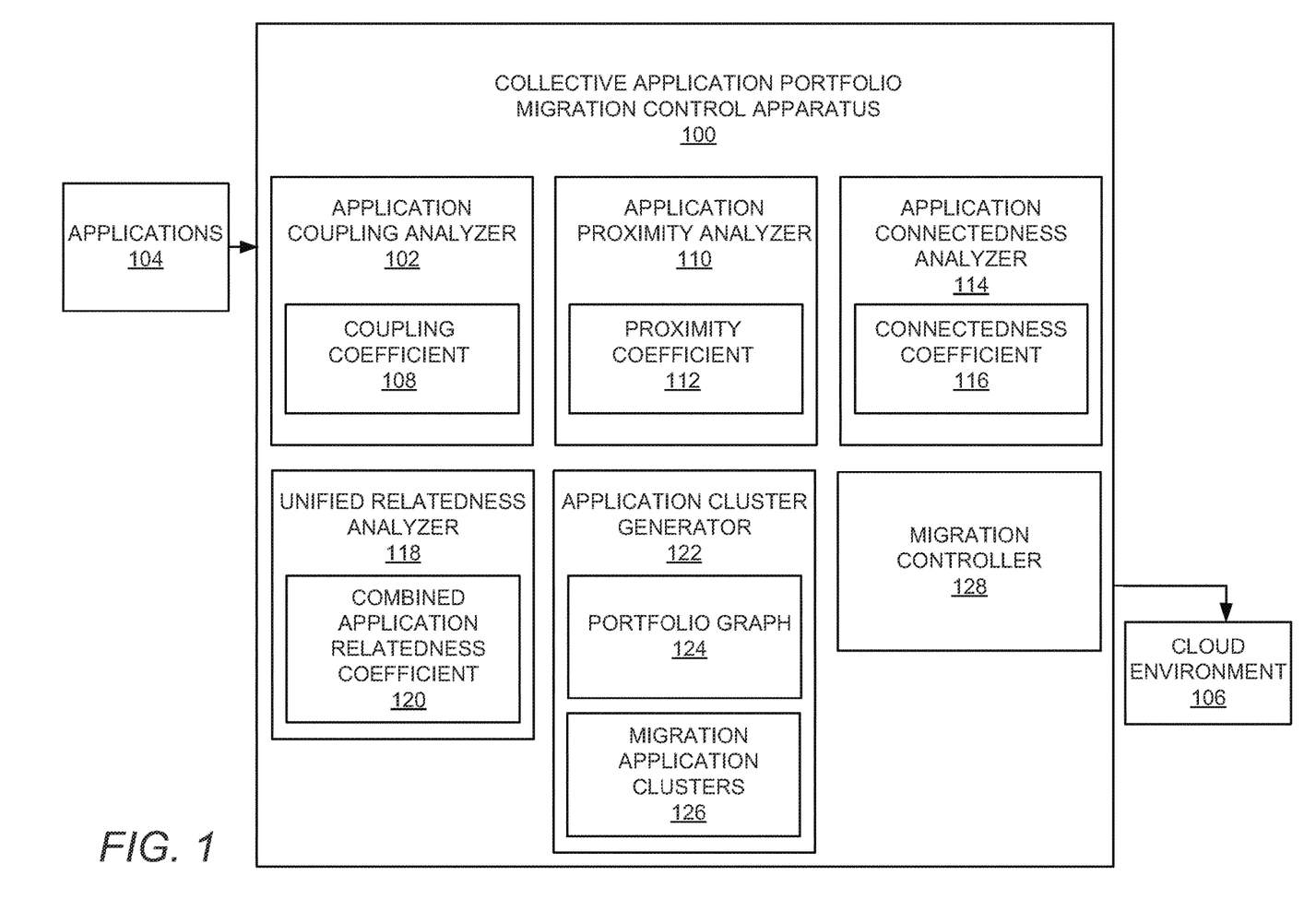
FIG. 1 illustrates a layout of a collective application portfolio migration control apparatus hi accordance with an example of the present disclosure.

FIG. 1 illustrates a layout of an example collective application portfolio migration control apparatus (hereinafter also referred to as "apparatus 100").

Referring to FIG. 1, the apparatus 100 may include an application coupling analyzer 102 that is executed by at least one hardware processor (e.g., the hardware processor 302 of FIG. 3, and/or the hardware processor 504 of FIG. 5) to determine, for a plurality of applications 104 that are to be clustered for migration to a cloud environment 106, a coupling coefficient 108 that represents a type of coupling between pairs of applications from the plurality of applications 104.

An application proximity analyzer 110 that is executed by at least one hardware processor (e.g., the hardware processor 302 of FIG. 3, and/or the hardware processor 504 of FIG. 5) may determine, for the plurality of applications 104 that are to be clustered, a proximity coefficient 112 that represents application proximities.

An application connectedness analyzer 114 that is executed by at least one hardware processor (e.g., the hardware processor 302 of FIG. 3, and/or the hardware processor 504 of FIG. 5) may determine, for the plurality of applications 104 that are to be clustered, a connectedness coefficient 116 that represents application connections.

A unified relatedness analyzer 118 that is executed by at least one hardware processor (e.g., the hardware processor 302 of FIG. 3, and/or the hardware processor 504 of FIG. 5) may determine, based on the coupling coefficient 108, the proximity coefficient 112, and the connectedness coefficient 116, a combined application relatedness coefficient 120.

An application cluster generator 122 that is executed by at least one hardware processor (e.g., the hardware processor 302 of FIG. 3, and/or the hardware processor 504 of FIG. 5) may generate, based on the combined application relatedness coefficient 120, a portfolio graph 124. The application cluster generator 122 may generate, based on the portfolio graph 124, migration application clusters 126 to cluster the plurality of applications 104.

A migration controller 128 that is executed by at least one hardware processor (e.g., the hardware processor 302 of FIG. 3, and/or the hardware processor 504 of FIG. 5) may control, based on the migration application clusters 126, migration of the plurality of applications 104 to the cloud environment 106.

According to examples disclosed herein, the application coupling analyzer 102 may determine, for the plurality of applications 104 that are to be clustered for migration to the cloud environment 106, the coupling coefficient 108 that represents the type of coupling that includes C-coupling. For a pair of applications that include applications A and B, application A is considered C-coupled with application B if application A passes control information to application B by invoking an instance of application B during execution of application A.

According to examples disclosed herein, the application coupling analyzer 102 may determine, for the plurality of applications 104 that are to be clustered for migration to the cloud environment 106, the coupling coefficient 108 that represents the type of coupling that includes D-coupling. For a pair of applications that include applications A and B, application A is considered D-coupled with another application B if application A accesses data generated by application B during execution of application A.

According to examples disclosed herein, the application coupling analyzer 102 may determine, for the plurality of applications 104 that are to be clustered for migration to the cloud environment 106, the coupling coefficient 108 that represents the type of coupling that includes R-coupling. For a pair of applications that include applications A and B, applications A and B are considered R-coupled with each other if both applications A and B access a same resource in an operating environment.

According to examples disclosed herein, the application proximity analyzer 110 may determine, for the plurality of applications 104 that are to be clustered, application proximities that include a technical proximity. For a pair of applications that include applications A and B, the technical proximity may represent a degree to which the applications A and B are of a same type.

According to examples disclosed herein, the application proximity analyzer 110 may determine, for the plurality of applications 104 that are to be clustered, application proximities that include data-residency proximity. For a pair of applications that include applications A and B, the data-residency proximity may represent an intersection of a data-residency requirement for application A with a data-residency requirement for application B, over a union of the data-residency requirement for application A with the data-residency requirement for application B.

According to examples disclosed herein, the application proximity analyzer 110 may determine, for the plurality of applications 104 that are to be clustered, application proximities that include regulatory proximity. For a pair of applications that include applications A and B, the regulatory proximity may represent an intersection of regulations for application A with regulations for application B, over a union of the regulations for application A with the regulations for application B.

According to examples disclosed herein, the application proximity analyzer 110 may determine, for the plurality of applications 104 that are to be clustered, application proximities that include cloud migration disposition proximity. For a pair of applications that include applications A and B, the cloud migration disposition proximity may represent a degree to which the applications A and B include similar migration dispositions.

According to examples disclosed herein, the application proximity analyzer 110 may determine, for the plurality of applications 104 that are to be clustered, application proximities that include a cloud readiness proximity. For a pair of applications that include applications A and B, the cloud readiness proximity may represent an intersection of cloud migration readiness for application A with cloud migration readiness for application B, over a union of the cloud migration readiness for application A with the cloud migration readiness for application B.

According to examples disclosed herein, the application proximity analyzer 110 may determine, for the plurality of applications 104 that are to be clustered, application proximities that include a cloud type proximity. For a pair of applications that include applications A and B, the cloud type proximity may represent a degree to which the applications A and B are migrated to similar cloud environments.

According to examples disclosed herein, the application connectedness analyzer 114 may determine, for the plurality of applications 104 that are to be clustered, application connections that include a migration team connectedness. For a pair of applications that include applications A and B, the migration team connectedness may represent an intersection of a migration team for application A with a migration team for application B, over a union of the migration team for application A with the migration team for application B.

According to examples disclosed herein, the application connectedness analyzer 114 may determine, for the plurality of applications 104 that are to be clustered, application connections that include data connectedness. For a pair of applications that include applications A and B, the data connectedness may represent an intersection of input data sources for application A with input data sources for application B, over a union of the input data sources for application A with the input data sources for application B.

According to examples disclosed herein, the application cluster generator 122 may generate, based on the combined application relatedness coefficient 120, the portfolio graph 124 that includes a set of nodes corresponding to the plurality of applications 104, a set of edges between those applications that include a specified value for the combined application relatedness coefficient 120, and a weight function that associates weights with the edges.

Figure 2:
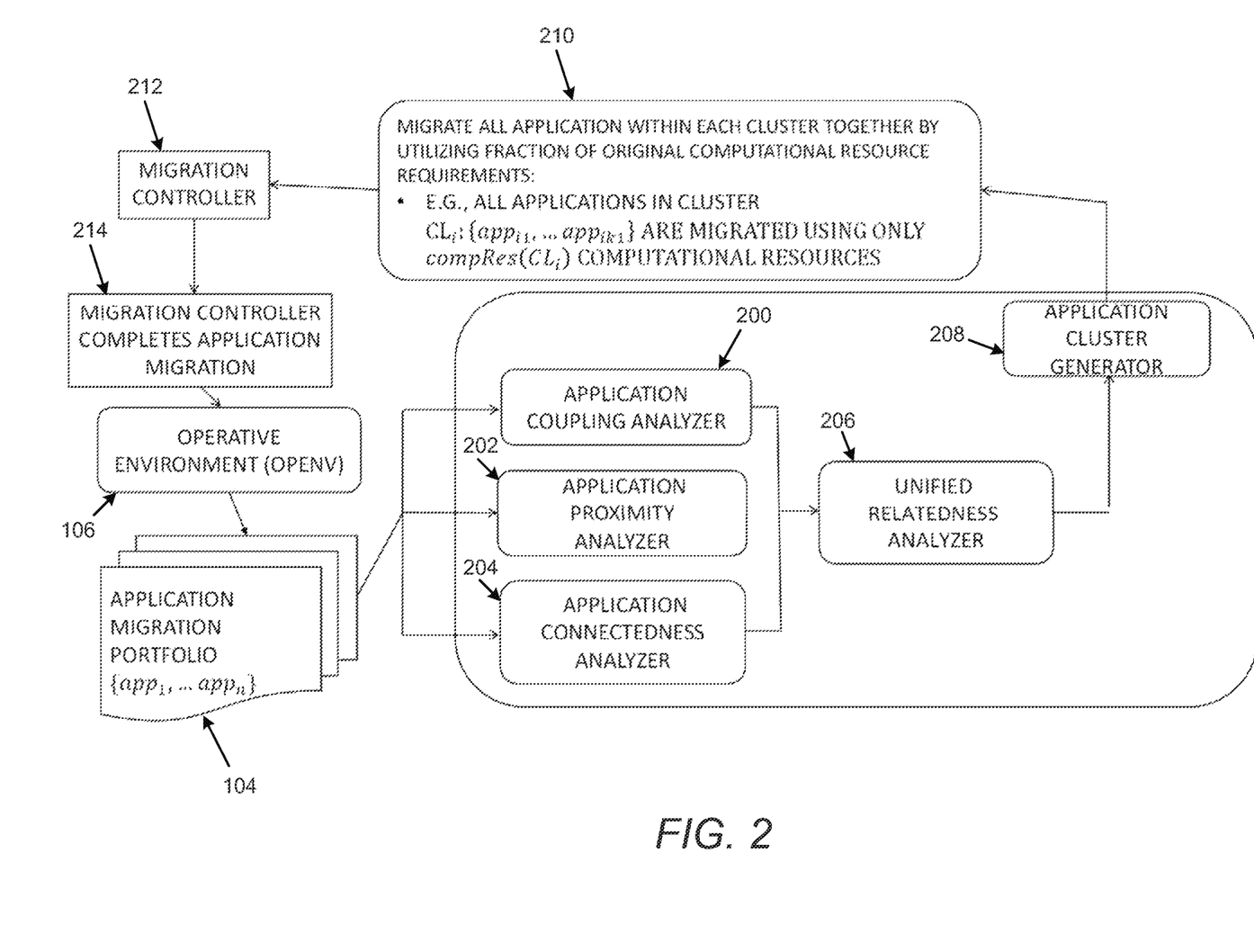
FIG. 2 illustrates a logical flow to illustrate operation of the collective application portfolio migration control apparatus of FIG. 1, in accordance with an example of the present disclosure.

FIG. 2 illustrates a logical flow to illustrate operation of the apparatus 100, in accordance with an example of the present disclosure.

Referring to FIGS. 1 and 2, at 200, the application coupling analyzer 102 may determine, for a plurality of applications 104 that are to be clustered for migration to the cloud environment 106, the coupling coefficient 108 that represents a type of coupling between pairs of applications from the plurality of applications 104.

With respect to determination of application coupling by the application coupling analyzer 102, for control coupling, successful operation of an application is dependent on execution of another application. Application A is considered C-Coupled with application B if application A passes control information to application B by way of invoking an instance of application B during its execution. Control coupling may be determined as follows:

Let $N_A$ be different run-time behaviors of application A. Two run-time behaviors may be considered different iff they differ in either their inputs or outputs.

Let $C_{A,B} \leq N_A$ be subset of executions, wherein application A invokes application B.

In terms of these, control coupling of application A with application B is measured as follows:

$$CCoupling(A, B) = \frac{C_{A,B}}{N_A}$$

Control coupling is a directed relationship, e.g., CCoupling(A,B)≠CCoupling(B,A)

Combined control coupling between application A and application B may be determined as a mean as follows:

cCoupling(A,B)=0.5*(CCoupling(A,B)+CCoupling(B,A))

With respect to determination of application coupling by the application coupling analyzer 102, for data coupling, if an application utilizes data generated by another application, application A is considered D-Coupled with another application B if application A accesses data generated by application B during its execution. Data-coupling may be determined as follows:

Let $d_{A,B} \leq N_A$ be subset of executions, wherein application A accesses data generated by application B.

In terms of these, data-coupling of application A with application B is measured as follows:

$$DCoupling(A, B) = \frac{d_{A,B}}{N_A}$$

Control coupling is also a directed relationship, e.g.,

DCoupling(A,B)≠DCoupling(B,A)

Combined data coupling between application A and application B is measured as a mean as follows:

cDCoupling(A,B)=0.5*(DCoupling(A,B)+DCoupling(B,A))

With respect to determination of application coupling by the application coupling analyzer 102, for resource coupling, applications may access a gammon database, load-balancer, and/or other resources of an operating environment during their execution, where accessing a resource may after their state. Applications A and B may be considered resource-coupled (R-Coupled) with each other if both access the same resources in the operating environment. Resource-coupling may be determined as follows:
Let
$r_{A,B} \geq 1$ be number of gammonresources accessed by application A and application B
$r_A \geq 1$ be number of resources accessed by application A
$r_B \geq 1$ be number of resources accessed by application B
Resource-coupling of application A with application B may be determined as follows:

$$RCoupling(A, B) = \frac{r_{A,B}}{r_A + r_B}$$

In this regard, control coupling may represent an undirected relationship, e.g., RCoupling(A,B)=RCoupling(B,A).

With respect to determination of application coupling by the application coupling analyzer 102, for unified coupling coefficient, in terms of C-Coupling, D-Coupling, and R-Coupling, the coupling coefficient between two applications may be determined as the convex combination of these as follows:

coupling_coeff(A,B)=$\alpha_c$×cCCoupling(A,B)+$\alpha_d$×cDCoupling(A,B)+$\alpha_r$×cDCoupling(A,B)

$\alpha_c$, $\alpha_d$, and $\alpha_r \in [0,1]$ measure relative significance of different types of couplings in the context of current application portfolio
($\alpha_c+\alpha_d+\alpha_r=1$) AND ($\alpha_c \geq \alpha_d > \alpha_r$)

At 202, the application proximity analyzer 110 may determine, for the plurality of applications 104 that are to be clustered, the proximity coefficient 112 that represents application proximities.

With respect to determination of application proximities by the application proximity analyzer 110, for technical proximity, the application proximity analyzer 110 may determine the degree to which applications are of same type (e.g., monolithic, cloud native, commercial off-the-shelf (COTS), or custom). The application proximity analyzer 110 may determine technical proximity between applications A and B as follows:
Let type(.): text be description of type of an application
If length(type(A))+length(type(B))≤15, e.g., type descriptions are short-texts techSim(A,B)=JC(type(A),type(B))

where JC(.,.): is Jaccard Coefficient
Else If length(type(A))+length(type(B))>15, e.g., type descriptions are long texts
Map type(A) and type(B) into embedding space as vectors: Let em(text) be the mapping function which maps input text into an embedding vector In terms of embeddings vectors, technical proximity is measured as techSim(A,B)=cos(em(type(A)),em(type(B)))

where cos(.,.): is cosine of the angle between vectors

With respect to determination of application proximities by the application proximity analyzer 110, for data-residency proximity, the application proximity analyzer 110 may determine a degree to which applications have same data-residency requirements. In this regard, the application proximity analyzer 110 may determine data-residency proximity between applications A and B as follows:
Let DataRes(application X): [($d_1$, $l_1$), . . . , ($d_k$, $l_k$)] be the list of data-residency requirements specifying that data $d_i$ must reside at location $l_i$ in the context of application X In terms of these residency requirements, proximity may be determined as follows:

$$Data\_Residency\_Sim(A, B) = \frac{DataRes(A) \cap DataRes(B)}{DataRes(A) \cup DataRes(B)}$$

// Fraction of Residency Requirements Common to Both Applications

With respect to determination of application proximities by the application proximity analyzer 110, for regulatory proximity, the application proximity analyzer 110 may determine a degree to which applications have similar regulatory constraints, e.g., applications falling under Health Insurance Portability and Accountability Act (HIPPA). The application proximity analyzer 110 may determine regulatory proximity between two applications A and B as follows:
Let Reg(application X):[$rg_1$, . . . ,$rg_k$] be the list of regulations application X must abide to
In terms of these, proximity is measured as $$regulatory\_Sim(A, B) = \frac{Reg(A) \cap Reg(B)}{Reg(A) \cup Reg(B)}$$

// Fraction of Residency Requirements Common to Both Applications

With respect to determination of application proximities by the application proximity analyzer 110, for cloud migration disposition proximity, the application proximity analyzer 110 may determine whether applications have similar migration dispositions. In this regard, migration dispositions may include:
Re-host (aka "lift and shift")
Re-platform (aka "lift, tinker, and shift")
Re-factor/Re-architect
Re-purchase
Retire
Retain (aka "re-visit")
Re-imagine
Between two applications A and B, the migration dispositions may be determined as follows:
Let md(application X) be the migration disposition for application X In terms of these, proximity may be determined as follows:

$$\text{cmd\_Sim}(A, B) = \begin{cases} 1 & \text{if } md(A) = md(B) \\ 0 & \text{otherwise} \end{cases}$$

With respect to determination of application proximities by the application proximity analyzer 110, for cloud readiness proximity, the application proximity analyzer 110 may determine a similarity between two applications for cloud migration readiness. Between two applications A and B, the cloud readiness proximity may be determined as follows:

Let cloudReady(application X)≥0 be the migration readiness score for application X In terms of these scores, cloud readiness proximity may be determined as follows:

$$\text{crSim}(A, B) = 1 - \frac{|cloudReady(A) - cloudReady(B)|}{cloudReady(A) + cloudReady(B)}$$

With respect to determination of application proximities by the application proximity analyzer 110, for cloud type proximity, the application proximity analyzer 110 may determine whether applications are being migrated to similar cloud environments. In this regard, the cloud type proximity between two applications A and B may be determined as follows:

Let cloudType(application X): string cloud environment to which application X is getting migrated to In terms of these scores, the cloud type proximity may be determined as follows:

$$\text{ct\_Sim}(A, B) = \begin{cases} 1 & \text{if } cloudType(A) = cloudType(B) \\ 0 & \text{otherwise} \end{cases}$$

With respect to determination of application proximities by the application proximity analyzer 110, for migration infrastructure proximity, the application proximity analyzer 110 may determine a degree to which applications have similar cloud infrastructure requirements. In this regard, the application proximity analyzer 110 may determine the migration infrastructure proximity between two applications A and B as follows:

Let mInfra(app X): [$i_1, \ldots, i_k$] be the list of different infrastructure element required for migration of application X In terms of these, the migration infrastructure proximity may be determined as follows:

$$\text{infra\_Sim}(A, B) = \frac{mInfra(A) \cap mInfra(B)}{mInfra(A) \cup mInfra(B)}$$

// Fraction of Migration Infrastructural Requirements Common to Both Applications With respect to determination of application proximities by the application proximity analyzer 110, for criticality proximity, the application proximity analyzer 110 may determine similarity between two application with respect to their organization criticalities. In this regard, the application proximity analyzer 110 may determine criticality proximity between two applications A and B as follows:

Let
cLevel(app X)≥0 be the organization criticality for application X, measured in a Likert Scale
maxLevel be the highest organization criticality for any application In terms of these, criticality proximity may be determined as rank order difference:

$$\text{Criticality\_Sim}(A, B) = 1 - \frac{|cLevel(A) - cLevel(B)|}{\text{max}Level}$$

With respect to determination of application proximities by the application proximity analyzer 110, for geo-location proximity, the application proximity analyzer 110 may determine a degree to which applications are similar with respect to user locations (e.g., different locations where these applications would be used by their users). The application proximity analyzer 110 may determine geo-location proximity between two applications A and B as follows:

Let loc(app X): [$loc_1, \ldots, loc_k$] be the list of different user locations for an application X Geo-location proximity may be determined as follows:

$$\text{Geo\_Loc\_Sim}(A, B) = \frac{loc(A) \cap loc(B)}{loc(A) \cup loc(B)}$$

// Fraction of User Locations Common to Both Applications

With respect to determination of application proximities by the application proximity analyzer 110, for client-base proximity, the application proximity analyzer 110 may determine a degree to which applications are similar with respect to their set of clients (e.g., different types of clients or users of the application). Examples of client type may include trial, single user, multiple users, corporate, government, educational, annual, life-time, etc. The application proximity analyzer 110 may determine client-base proximity between two applications A and B as follows:

Let clientType(app X): [$cl_1, \ldots, cl_k$] be the list of different types of clients for an application X In terms of these, client-base proximity may be determined as follows:

$$\text{clientType\_Sim}(A, B) = \frac{clientType(A) \cap clientType(B)}{clientType(A) \cup clientType(B)}$$

// Fraction of User Client-Types Common to Both Applications

With respect to determination of application proximities by the application proximity analyzer 110, for migration basis proximity; the application proximity analyzer 110 may determine a degree to which applications are being migrated from proprietary licensed software to open alternatives or when shared application environments are being phased out (e.g., JBoss/IBM WebSphere to Tomcat, etc.). The application proximity analyzer 110 may determine migration basis proximity between two applications A and B as follows:

Let LicType(app X): [$l_1, \ldots, l_k$] be the list of different licenses required by an application X Migration basis proximity may be determined as follows:

$$\text{mBasis\_Sim}(A, B) = \frac{LicType(A) \cap LicType(B)}{LicType(A) \cup LicType(B)}$$

// Fraction of 3$^{rd}$ Party Licenses Common to Both Applications

With respect to determination of application proximities by the application proximity analyzer 110, for migration skills proximity, the application proximity analyzer 110 may determine a degree to which applications have same (or overlapping) set of required skills to work on their migration. The application proximity analyzer 110 may determine migration skills proximity between two applications A and B as follows:

Let mskills(app X): [$x_1, \ldots, x_k$] be the set of skills required for an application X's migration Migration skills proximity may be determined as follows:

$$mSkill\_Sim(A, B) = \frac{mSkills(A) \cap mSkills(B)}{mSkills(A) \cup mSkills(B)}$$

With respect to determination of application proximities by the application proximity analyzer 110, the application proximity analyzer 110 may determine a unified proximity coefficient. With respect to different types of proximities, the unified proximity coefficient between two applications may be determined as the convex combination as follows:

sim_coeff(A,B)=$\alpha_{p1}$techSim(A,B)+
$\alpha_{p2}$Data_Residency_
Sim(A,B)+ . . . +$\alpha_{p12}$mSkill_Sim(A,B)

$\alpha_{p1}, \ldots, \alpha_{p12} \in [0,1]$ measure relative significance of different types of proximities in the context of current application portfolio $\Sigma_{i \in [1,12]} \alpha_{pi} = 1$ Default: $\forall i: \alpha_{pi} = 1/12$ At 204, the application connectedness analyzer 114 may determine, for the plurality of applications 104 that are to be clustered, the connectedness coefficient 116 that represents application connections.

With respect to determination of application connections by the application connectedness analyzer 114, for migration team connectedness, the application connectedness analyzer 114 may determine a degree to which applications have same (or overlapping) teams to work on their migration. The migration team connectedness between two applications A and B may be determined as follows:

Let mTeam(app X): [$r_1, \ldots, r_k$] be the migration team for an application X In terms of these, migration team connectedness may be determined as follows:

$$mTeam\_Conn(A, B) = \frac{mTeam(A) \cap mTeam(B)}{mTeam(A) \cup mTeam(B)}$$

With respect to determination of application connections by the application connectedness analyzer 114, for data connectedness, the application connectedness analyzer 114 may determine a degree to which applications share data (e.g., regulated data) from the same sources. The data connectedness between two applications A and B may be determined as follows:

Let InDataSources(app X): [$r_1, \ldots, r_k$] be the set of input data sources for an application X Data connectedness may be determined as follows:

$$Data\_Conn(A, B) = \frac{InDataSources(A) \cap InDataSources(B)}{InDataSources(A) \cup InDataSources(B)}$$

With respect to team and data level connections among applications, the application connectedness analyzer 114 may determine a unified connectedness coefficient as follows:

conn_coeff(A,B)=$\alpha_{c1}$mTeam_Conn(A,B)+
$\alpha_{c2}$Data_Conn(A,B)

$\alpha_{c1}$ and $\alpha_{c2} \in [0,1]$ may determine relative significance of migration team and data level connections between applications in the context of the current application portfolio $\Sigma_{i \in [1,2]} \alpha_{ci} = 1$ Default: $\forall i: \alpha_{ci} = 1/2$ At 206, the unified relatedness analyzer 118 may determine, based on the coupling coefficient 108, the proximity coefficient 112, and the connectedness coefficient 116, the combined application relatedness coefficient 120.

With respect to unified coupling, proximity, and connectedness coefficients, the unified relatedness analyzer 118 may determine a combined application relatedness coefficient (e.g., unified relatedness) between a pair of applications as follows:

combined_coeff(A,B)=$\beta_1$coupling_coeff(A,B)+
$\beta_2$proximity_coeff(A,B)+$\beta_3$conn_coeff(A,B)

$\beta_{1,2,3} \in [0,1]$ may determine the relative significance of coupling, proximity, and connectedness between applications in the context of the current application portfolio $\Sigma_{i \in [1,2]} \beta_i = 1$ Default: $\beta_1 = 0.5, \beta_2 = 0.3, \beta_1 = 0.2$ At 208, the application cluster generator 122 may generate, based on the combined application relatedness coefficient 120, the portfolio graph 124. The application cluster generator 122 may generate, based on the portfolio graph 124, migration application clusters 126 to cluster the plurality of applications 104.

With respect to generation of application clusters, the application cluster generator 122 may generate a portfolio graph as follows:

Let $G_x = (V_{pf}, E_{pf}, wt)$ be application portfolio network such that $V_{pf}$ is the set of nodes corresponding to the set applications in the migration portfolio so that each application has a separate node $E_{pf} = \{(v_{app1}, v_{app2}) | C_1$ AND $C_2$ AND $C_3 =$True$\}$ $C_1: v_{app1}, v_{app2} \in V_{pf}$ $C_2: v_{app1} \neq v_{app2}$ $C_3$: combined_coeff(app1,app2)$\geq \delta$(default $\delta = 0.85$)

$E_{pf}$ may be set of edges between those applications for which combined relatedness is more than 0.85 wt: $E_x \mapsto [0,1]$ may represent the weight function which associates weights with edges such that wt($v_{app1}, v_{app2}$)=combined_coeff(app1, app2)

With respect to generation of application clusters; the application duster generator 122 may generate migration application clusters 126. In this regard, a connected component (CC) in a graph may represent a (sub)graph in which all the nodes are connected to each other either through direct one to one edges or through multiple edges in sequence. A maximal connected component may represent a connected component which is not a subgraph of any other connected component. The application cluster generator 122 may identify all maximal connected components in the graph $G_{pf}$. Each such connected component is a migration application cluster. Each of these migration application clusters are given to the migration controller 128 so that all the applicationsontained within migration application cluster are to be migrated together.

With respect to ordering of clusters, as shown at 210, each of these migration application clusters may be received by the migration controller 128 at 212 in order of the average relatedness among applications within the same cluster as follows:

$CL_1$: {$app_1, \ldots, app_{k1}$}
$CL_2$: {$app_{k1+1}, \ldots, app_{k2}$}, ...
$CL_x$: {$app_{kx+1}, \ldots app_n$}

In this regard, the average relatedness among applications in $CL_1$ is highest across all clusters, for $CL_2$ is next highest, etc. All the applications contained within a migration application cluster are planned for to be migrated together using a faction of computational resources, which were originally allocated.

At 214, the migration controller 128 may control, based on the migration application clusters 126, migration of the plurality of applications 104 to the cloud environment 106.

The migration controller 128 may provide for reduction of utilization of computational resources (e.g., processor time, network bandwidth, and energy) by making the migration process computationally efficient. The computational resource reduction for the migration process may be approximated by a factor, such as a Silhouette factor, of the migration application clusters $\Delta = [CL_1, \ldots, CL_x]$. In this regard, for each application $app_i$, the following factors may be determined:

a(i)=average ARC of $app_i$ with all other applications in its cluster
b(i)=minimum of the average ARC of $app_i$ with applications in other clusters The Silhouette factor s(i) for $app_i$ may then be determined as follows:

$$\bullet\ s(i) = \begin{cases} 1 - a(i)/b(i) & \text{if } a(i) < b(i) \\ b(i)/a(i) - 1 & \text{otherwise} \end{cases}$$

The Silhouette factor for each cluster $CL_i$ may be determined as follows:

$$\bullet\ s(CL_i) = \frac{1}{|CL_i|} \sum_{app_{ij} \in CL_i} s(j)$$

An overall Silhouette factor of $\Delta$ may be determined as follows:

$$\bullet\ s(\Delta) = \frac{1}{n} \sum_{app_i} s(i)$$

While migrating applications within each cluster together, the migration controller may utilize a fraction of computational resources, which were originally allocated. In this regard, $\lambda_{ij}$ may be specified as the original computational resource requirement for migration of application $app_{ij} \in CL_i$. The migration controller may utilize compRes $(CL_i) = s(CL_i) * \Sigma_{app_{ij} \in CL_i} \lambda_{ij}$ to determine the computational resources for cluster $CL_i$.

Figure 3:
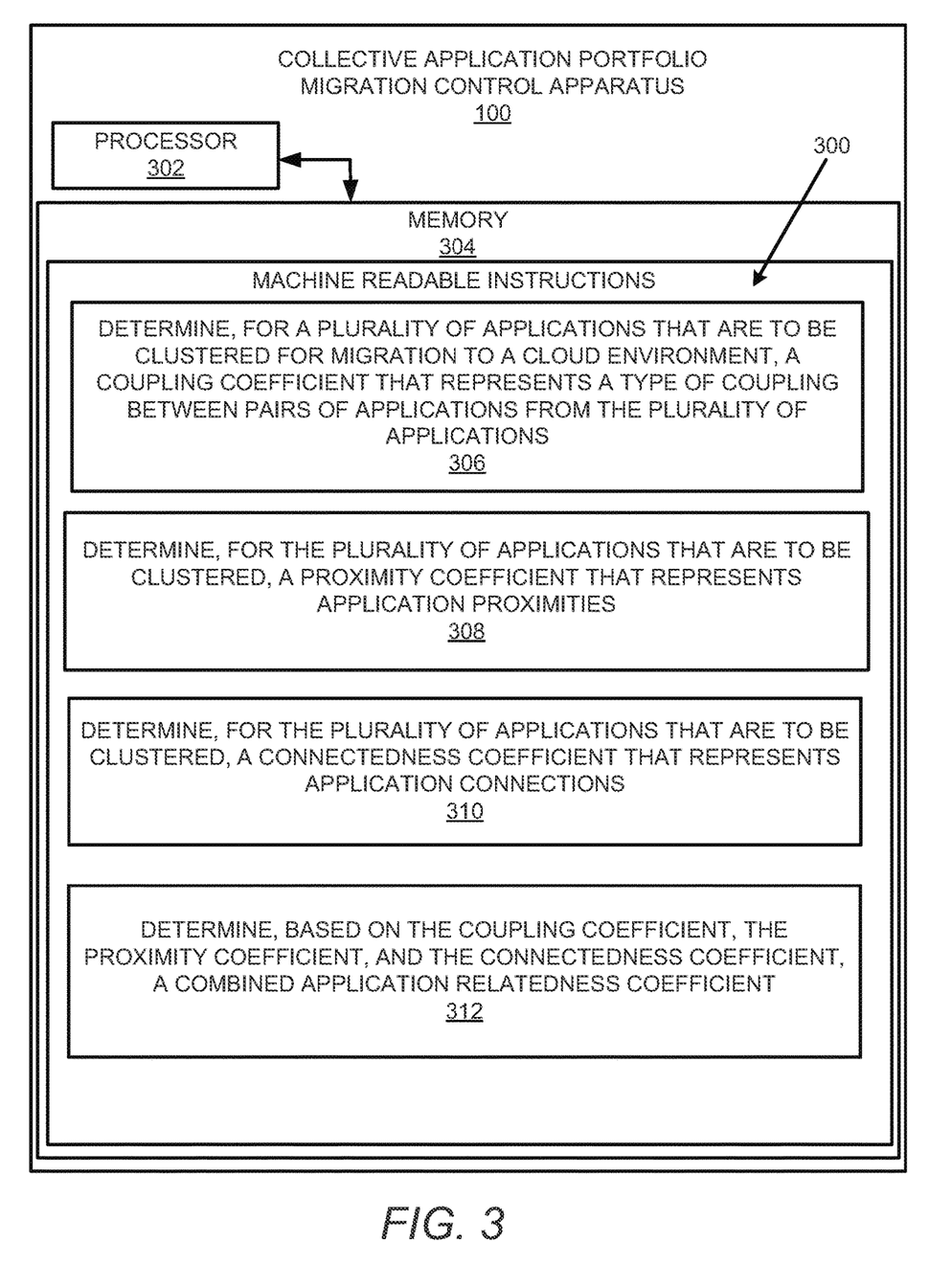
FIG. 3 illustrates an example block diagram for collective application portfolio migration control in accordance with an example of the present disclosure.
Figure 4:
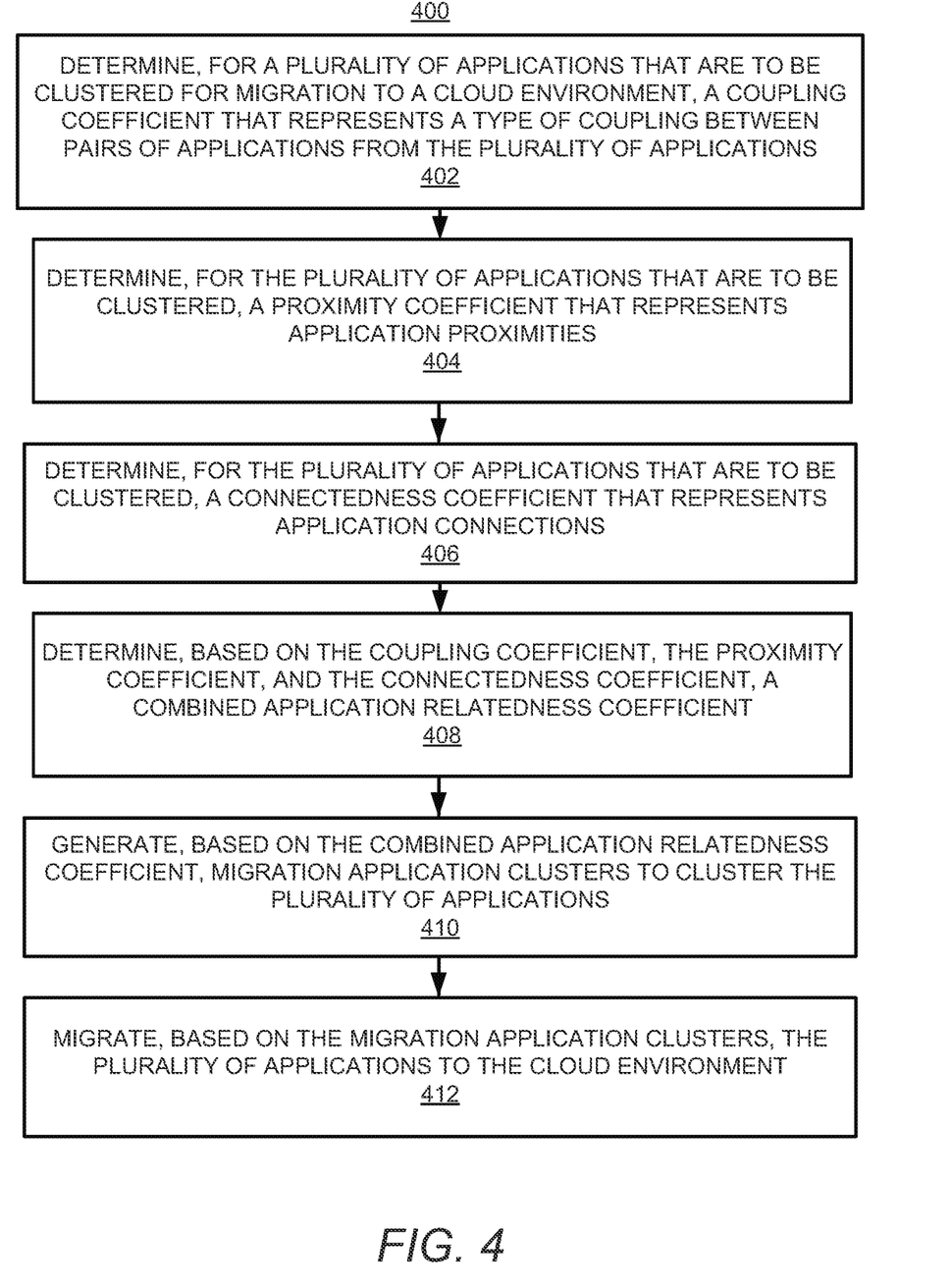
FIG. 4 illustrates a flowchart of an example method for collective application portfolio migration control in accordance with an example of the present disclosure.
Figure 5:
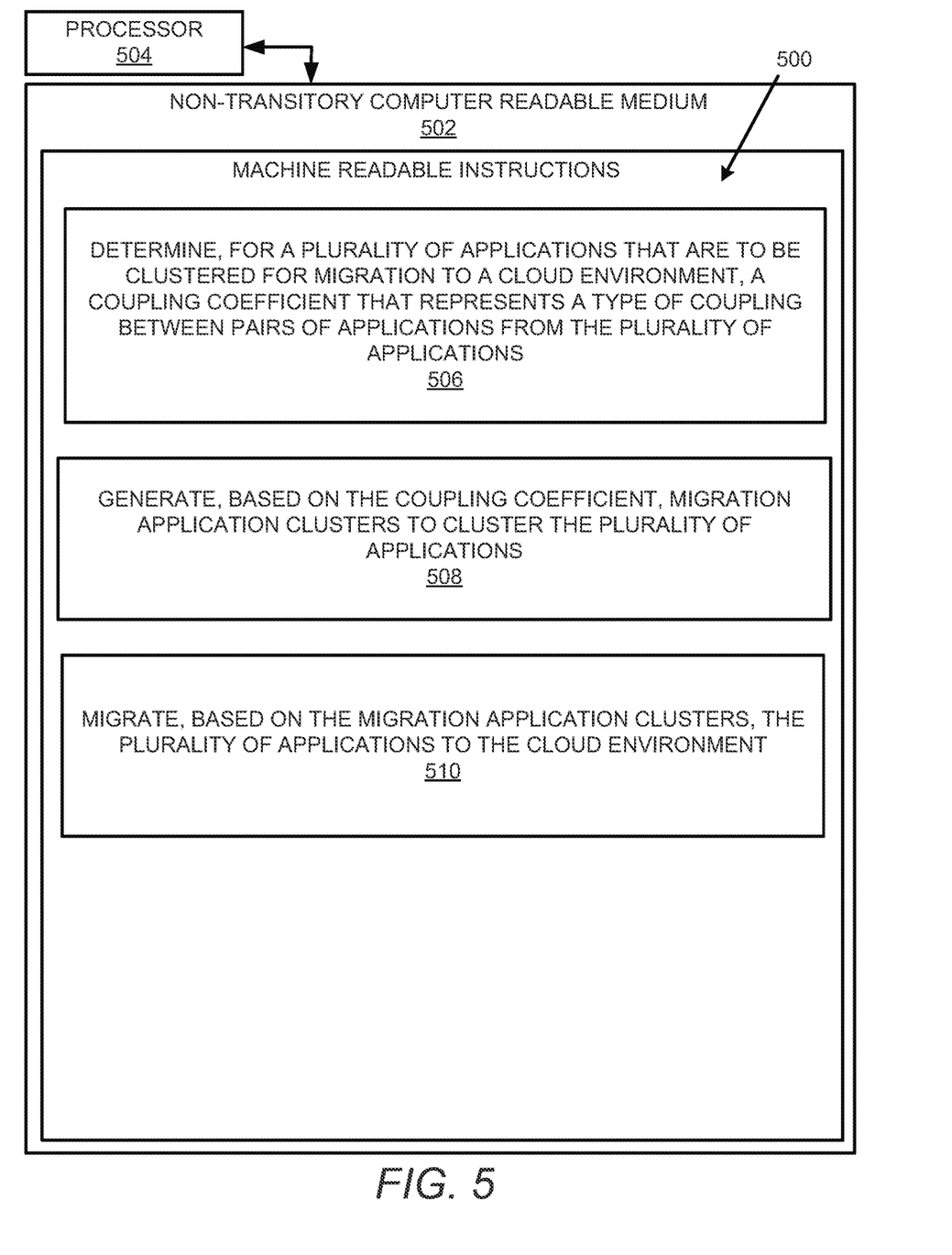
FIG. 5 illustrates a further example block diagram for collective application portfolio migration control in accordance with another example of the present disclosure.

FIGS. 3-5 respectively illustrate an example block diagram 300, a flowchart of an example method 400, and a further example block diagram 500 for collective application portfolio migration control, according to examples. The block diagram 300, the method 400, and the block diagram 500 may be implemented on the apparatus 30 described above with reference to FIG. 1 by way of example and not of limitation. The block diagram 300, the method 400, and the block diagram 500 may be practiced in other apparatus. In addition to showing the block diagram 300, FIG. 3 shows hardware of the apparatus 30 that may execute the instructions of the block diagram 300. The hardware may include a processor 302, and a memory 304 storing machine readable instructions that when executed by the processor cause the processor to perform the instructions of the block diagram 300. The memory 304 may represent a non-transitory computer readable medium. FIG. 4 may represent an example method for collective application portfolio migration control, and the steps of the method. FIG. 5 may represent a non-transitory computer readable medium 502 having stored thereon machine readable instructions to provide collective application portfolio migration control according to an example. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to determine, for a plurality of applications 104 that are to be clustered for migration to a cloud environment 106, a coupling coefficient 108 that represents a type of coupling between pairs of applications from the plurality of applications 104.

The processor 302 may fetch, decode, and execute the instructions 308 to determine, for the plurality of applications 104 that are to be clustered, a proximity coefficient 112 that represents application proximities.

The processor 302 may fetch, decode, and execute the instructions 310 to determine, for the plurality of applications 104 that are to be clustered, a connectedness coefficient 116 that represents application connections.

The processor 302 may fetch, decode, and execute the instructions 312 to determine, based on the coupling coefficient 108, the proximity coefficient 112, and the connectedness coefficient 116, a combined application relatedness coefficient 120.

The processor 302 may fetch, decode, and execute the instructions 314 to generate, based on the combined application relatedness coefficient 120, a portfolio graph 124.

The processor 302 may fetch, decode, and execute the instructions 316 to generate, based on the portfolio graph 124, migration application clusters 126 to cluster the plurality of applications 104.

The processor 302 may fetch, decode, and execute the instructions 318 to control, based on the migration application clusters 126, migration of the plurality of applications 104 to the cloud environment 106.

Referring to FIGS. 1-2 and 4, and particularly FIG. 4, for the method 400, at block 402, the method may include determining, for a plurality of applications that are to be clustered for migration to a cloud environment, a coupling coefficient that represents a type of coupling between pairs of applications from the plurality of applications.

At block 404, the method may include determining, for the plurality of applications that are to be clustered, a proximity coefficient that represents application proximities.

At block 406, the method may include determining, for the plurality of applications that are to be clustered, a connectedness coefficient that represents application connections.

At block 408, the ethod may include determining, based on the coupling coefficient, the proximity coefficient, and the connectedness coefficient, a combined application relatedness coefficient.

At block 410, the method may include generating, based on the combined application relatedness coefficient, migration application clusters to duster the plurality of applications.

At block 412, the method may include migrating, based on the migration application clusters, the plurality of applications to the cloud environment.

Referring to FIGS. 1-2 and 5, and particularly FIG. 5, for the block diagram 500, the non-transitory computer readable medium 502 may include instructions 506 to determine, for a plurality of applications that are to be clustered for migration to a cloud environment, a coupling coefficient that represents a type of coupling between pairs of applications from the plurality of applications.

The processor 504 may fetch, decode, and execute the instructions 508 to generate, based on the coupling coefficient, migration application clusters to cluster the plurality of applications.

The processor 504 may fetch, decode, and execute the instructions 510 to migrate, based on the migration application clusters, the plurality of applications to the cloud environment.

What has been described and illustrated hereinis an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A collective application portfolio migration control apparatus comprising:
    at least one hardware processor;
    an application coupling analyzer, executed by the at least one hardware processor, to determine, for a plurality of applications that are to be clustered for migration to a cloud environment, a coupling coefficient that represents a type of coupling between pairs of applications from the plurality of applications, wherein the type of coupling includes C-coupling, wherein for a pair of applications that include applications A and B, application A is considered C-coupled with application B if application A passes control information to application B by invoking an instance of application B during execution of application A;
    an application proximity analyzer, executed by the at least one hardware processor, to determine, for the plurality of applications that are to be clustered, a proximity coefficient that represents application proximities;
    an application connectedness analyzer, executed by the at least one hardware processor, to determine, for the plurality of applications that are to be clustered, a connectedness coefficient that represents application connections;
    a unified relatedness analyzer, executed by the at least one hardware processor, to determine, based on the coupling coefficient, the proximity coefficient, and the connectedness coefficient, a combined application relatedness coefficient;
    an application cluster generator, executed by the at least one hardware processor, to generate, based on the combined application relatedness coefficient, a portfolio graph, and generate, based on the portfolio graph, migration application clusters to cluster the plurality of applications; and
    a migration controller, executed by the at least one hardware processor, to control, based on the migration application clusters, migration of the plurality of applications to the cloud environment.

2. The collective application portfolio migration control apparatus according to claim 1, wherein the application coupling analyzer is executed by the at least one hardware processor to determine, for the plurality of applications that are to be clustered for migration to the cloud environment, the coupling coefficient that represents the type of coupling between pairs of applications from the plurality of applications by:
    determining, for the plurality of applications that are to be clustered for migration to the cloud environment, the coupling coefficient that represents the type of coupling that includes D-coupling, wherein for a pair of applications that include applications A and B, application A is considered D coupled with another application B if application A accesses data generated by application B during execution of application A.

3. The collective application portfolio migration control apparatus according to claim 1, wherein the application coupling analyzer is executed by the at least one hardware processor to determine, for the plurality of applications that are to be clustered for migration to the cloud environment, the coupling coefficient that represents the type of coupling between pairs of applications from the plurality of applications by:
    determining, for the plurality of applications that are to be clustered for migration to the cloud environment, the coupling coefficient that represents the type of coupling that includes R-coupling,
    wherein for a pair of applications that include applications A and B, applications A and B are considered R-coupled with each other if both applications A and B access a same resource in an operating environment.

4. The collective application portfolio migration control apparatus according to claim 1, wherein the application proximity analyzer is executed by the at least one hardware processor to determine, for the plurality of applications that are to be clustered, the proximity coefficient that represents application proximities by:
    determining, for the plurality of applications that are to be clustered, application proximities that include a technical proximity, wherein for a pair of applications that include applications A and B, the technical proximity represents a degree to which the applications A and B are of a same type.

5. The collective application portfolio migration control apparatus according to claim 1, wherein the application proximity analyzer is executed by the at least one hardware processor to determine, for the plurality of applications that are to be clustered, the proximity coefficient that represents application proximities by:

determining, for the plurality of applications that are to be clustered, application proximities that include a data-residency proximity, wherein for a pair of applications that include applications A and B, the data-residency proximity represents an intersection of a data-residency requirement for application A with a data-residency requirement for application B, over a union of the data-residency requirement for application A with the data-residency requirement for application B.

6. The collective application portfolio migration control apparatus according to claim 1, wherein the application proximity analyzer is executed by the at least one hardware processor to determine, for the plurality of applications that are to be clustered, the proximity coefficient that represents application proximities by:

determining, for the plurality of applications that are to be clustered, application proximities that include a regulatory proximity, wherein for a pair of applications that include applications A and B, the regulatory proximity represents an intersection of regulations for application A with regulations for application B, over a union of the regulations for application A with the regulations for application B.

7. The collective application portfolio migration control apparatus according to claim 1, wherein the application proximity analyzer is executed by the at least one hardware processor to determine, for the plurality of applications that are to be clustered, the proximity coefficient that represents application proximities by:

determining, for the plurality of applications that are to be clustered, application proximities that include a cloud migration disposition proximity, wherein for a pair of applications that include applications A and B, the cloud migration disposition proximity represents a degree to which the applications A and B include similar migration dispositions.

8. The collective application portfolio migration control apparatus according to claim 1, wherein the application proximity analyzer is executed by the at least one hardware processor to determine, for the plurality of applications that are to be clustered, the proximity coefficient that represents application proximities by:

determining, for the plurality of applications that are to be clustered, application proximities that include a cloud readiness proximity, wherein for a pair of applications that include applications A and B, the cloud readiness proximity represents an intersection of cloud migration readiness for application A with cloud migration readiness for application B, over a union of the cloud migration readiness for application A with the cloud migration readiness for application B.

9. The collective application portfolio migration control apparatus according to claim 1, wherein the application proximity analyzer is executed by the at least one hardware processor to determine, for the plurality of applications that are to be clustered, the proximity coefficient that represents application proximities by:

determining, for the plurality of applications that are to be clustered, application proximities that include a cloud type proximity, wherein for a pair of applications that include applications A and B, the cloud type proximity represents a degree to which the applications A and B are migrated to similar cloud environments.

10. The collective application portfolio migration control apparatus according to claim 1, wherein the application connectedness analyzer is executed by the at least one hardware processor to determine, for the plurality of applications that are to be clustered, the connectedness coefficient that represents application connections by:

determining, for the plurality of applications that are to be clustered, application connections that include a migration team connectedness, wherein for a pair of applications that include applications A and B, the migration team connectedness represents an intersection of a migration team for application A with a migration team for application B, over a union of the migration team for application A with the migration team for application B.

11. The collective application portfolio migration control apparatus according to claim 1, wherein the application connectedness analyzer is executed by the at least one hardware processor to determine, for the plurality of applications that are to be clustered, the connectedness coefficient that represents application connections by:

determining, for the plurality of applications that are to be clustered, application connections that include data connectedness, wherein for a pair of applications that include applications A and B, the data connectedness represents an intersection of input data sources for application A with input data sources for application B, over a union of the input data sources for application A with the input data sources for application B.

12. The collective application portfolio migration control apparatus according to claim 1, wherein the application cluster generator is executed by the at least one hardware processor to generate, based on the combined application relatedness coefficient, the portfolio graph by: generating, based on the combined application relatedness coefficient, the portfolio graph that includes a set of nodes corresponding to the plurality of applications, a set of edges between those applications that include a specified value for the combined application relatedness coefficient, and a weight function that associates weights with the edges.

13. A method for collective application portfolio migration control, the method comprising:

determining, by at least one hardware processor, for a plurality of applications that are to be clustered for migration to a cloud environment, a coupling coefficient that represents a type of coupling between pairs of applications from the plurality of applications, wherein the type of coupling includes rein or pair of applications that include applications A and B, application A is consider coupled with another application B if application A accesses data generated by application B during execution of application A;

determining, by the at least one hardware processor, for the plurality of applications that are to be clustered, a proximity coefficient that represents application proximities;

determining, by the at least one hardware processor, for the plurality of applications that are to be clustered, a connectedness coefficient that represents application connections;

determining, by the at least one hardware processor, based on the coupling coefficient, the proximity coefficient, and the connectedness coefficient, a combined application relatedness coefficient;

generating, by the at least one hardware processor, based on the combined application relatedness coefficient, a portfolio graph, and generating, by the at least one hardware processor based on the portfolio graph, migration application clusters to cluster the plurality of applications; and migrating, by the at least one hardware processor, based on the migration application clusters, the plurality of applications to the cloud environment.

14. The method according to claim 13, wherein determining, by the at least one hardware processor, for the plurality of applications that are to be clustered for migration to the cloud environment, the coupling coefficient that represents the type of coupling between pairs of applications from the plurality of applications, further comprises:

determining, for the plurality of applications that are to be clustered for migration to the cloud environment, the coupling coefficient that represents the type of coupling that includes C-coupling, wherein for a pair of applications that include applications A and B, application A is considered C coupled with application B if application A passes control information to application B by invoking an instance of application B during execution of application A.

15. The method according to claim 13, wherein determining, by the at least one hardware processor, for the plurality of applications that are to be clustered for migration to the cloud environment, the coupling coefficient that represents the type of coupling between pairs of applications from the plurality of applications, further comprises:

determining, for the plurality of applications that are to be clustered for migration to the cloud environment, the coupling coefficient that represents the type of coupling that includes R-coupling, wherein for a pair of applications that include applications A and B, applications A and B are considered R-coupled with each other if both applications A and B access a same resource in an operating environment.

16. A non-transitory computer readable medium having stored thereon machine readable instructions, the machine readable instructions, when executed by at least one hardware processor, cause the at least one hardware processor to:

determine, for a plurality of applications that are to be clustered for migration to a cloud environment, a coupling coefficient that represents a type of coupling between pairs of applications from the plurality of applications, wherein the type of coupling includes C-coupling, wherein for a pair of applications that include applications A and B, application A is considered C coupled with application B if application A passes control information to application B by invoking an instance of application B during execution of application A;

determine, for the plurality of applications that are to be clustered, a proximity coefficient that represents application proximities;

determine, for the plurality of applications that are to be clustered, a connectedness coefficient that represents application connections;

determine, based on the coupling coefficient, the proximity coefficient, and the connectedness coefficient, a combined application relatedness coefficient;

generate, based on the coupling coefficient, migration application clusters to cluster the plurality of applications; and generate, based on the combined application relatedness coefficient, a portfolio graph, and generate, based on the portfolio graph, migration application clusters to cluster the plurality of applications;

control, based on the migration application clusters, migration of the plurality of applications to the cloud environment migrate, based on the migration application clusters, the plurality of applications to the cloud environment.

* * * * *